(12) United States Patent
Subbaraman et al.

(10) Patent No.: US 11,271,251 B2
(45) Date of Patent: Mar. 8, 2022

(54) BATTERY CELL WITH ANODE PROTECTIVE LAYER

(71) Applicant: Robert Bosch GmbH, Stuttgart (DE)

(72) Inventors: Ram Subbaraman, Sunnyvale, CA (US); Sondra Hellstrom, East Palo Alto, CA (US); Abdul-Kader Srouji, San Francisco, CA (US); Ingo Kerkamm, Stuttgart-Rohr (DE); John F. Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 16/002,603

(22) Filed: Jun. 7, 2018

(65) Prior Publication Data

US 2018/0358659 A1 Dec. 13, 2018

Related U.S. Application Data

(60) Provisional application No. 62/517,355, filed on Jun. 9, 2017.

(51) Int. Cl.
*H01M 10/0585* (2010.01)
*H01M 10/0525* (2010.01)
(Continued)

(52) U.S. Cl.
CPC ......... *H01M 10/0585* (2013.01); *H01M 4/13* (2013.01); *H01M 4/134* (2013.01); *H01M 4/366* (2013.01); *H01M 4/382* (2013.01); *H01M 4/661* (2013.01); *H01M 4/667* (2013.01); *H01M 10/0525* (2013.01); *H01M 10/0562* (2013.01); *H01M 10/0565* (2013.01);
(Continued)

(58) Field of Classification Search
CPC ............... H01M 2/162; H01M 2/1646; H01M 2/1653; H01M 2/166; H01M 4/13; H01M 4/134; H01M 4/366; H01M 4/382; H01M 4/661; H01M 4/667; H01M 10/052; H01M 10/0525; H01M 10/0562; H01M 10/0565; H01M 10/0585; H01M 2300/0065; H01M 2300/0068; H01M 2300/0082
See application file for complete search history.

(56) References Cited

U.S. PATENT DOCUMENTS

| 2003/0036000 A1* | 2/2003 | Mori | H01M 4/13 429/231.95 |
| 2003/0054249 A1* | 3/2003 | Yamamoto | H01M 4/13 429/231.1 |

(Continued)

FOREIGN PATENT DOCUMENTS

WO    2015185129    12/2015

OTHER PUBLICATIONS

International Search Report corresponding to International Patent Application No. PCT/EP2018/063783 (5 pages).
(Continued)

*Primary Examiner* — Brittany L Raymond
(74) *Attorney, Agent, or Firm* — Maginot, Moore & Beck LLP

(57) ABSTRACT

A lithium battery cell having one or more protective layers between the anode current collector and a solid state separator. The protective layers prevent dendrite propagation through the battery cell and improve coulombic efficiency by reducing deleterious side reactions.

19 Claims, 1 Drawing Sheet

(51) Int. Cl.
*H01M 4/13* (2010.01)
*H01M 4/66* (2006.01)
*H01M 4/36* (2006.01)
*H01M 10/0565* (2010.01)
*H01M 4/38* (2006.01)
*H01M 10/0562* (2010.01)
*H01M 4/134* (2010.01)
*H01M 50/44* (2021.01)
*H01M 50/411* (2021.01)
*H01M 50/431* (2021.01)
*H01M 10/052* (2010.01)

(52) U.S. Cl.
CPC ....... *H01M 50/411* (2021.01); *H01M 50/431* (2021.01); *H01M 50/44* (2021.01); *H01M 10/052* (2013.01); *H01M 2300/0065* (2013.01); *H01M 2300/0068* (2013.01); *H01M 2300/0082* (2013.01)

(56) References Cited

U.S. PATENT DOCUMENTS

| | | | |
|---|---|---|---|
| 2005/0089757 A1* | 4/2005 | Bannai | H01M 4/13 429/231.8 |
| 2010/0104948 A1 | 4/2010 | Skotheim et al. | |
| 2011/0033755 A1 | 2/2011 | Eitouni et al. | |
| 2013/0115510 A1* | 5/2013 | Tani | H01M 4/0404 429/199 |
| 2014/0170465 A1* | 6/2014 | Visco | H01G 11/58 429/144 |
| 2014/0212735 A1* | 7/2014 | Li | H01M 10/0525 429/162 |
| 2014/0272594 A1* | 9/2014 | Safont Sempere | H01M 4/134 429/231.95 |
| 2015/0263382 A1 | 9/2015 | Sing et al. | |
| 2016/0149261 A1 | 5/2016 | Zaghib et al. | |
| 2016/0156062 A1 | 6/2016 | Littau et al. | |
| 2016/0308263 A1* | 10/2016 | Shevchenko | H01M 4/131 |
| 2017/0155143 A1* | 6/2017 | An | H01M 4/131 |

OTHER PUBLICATIONS

Fergus, J. W., "Ceramic and polymeric solid electrolytes for lithium-ion batteries," Journal of Power Sources, vol. 195, No. 15, 2010 (16 pages).

Almeida, E. C. et al., "Electrochemcial Insertion of lithium into doped diamond grown on carbon felt substrates", INPE ePrint:sid.inpe.br/yolanda/2004/12.08.14.16 v1, Dec. 2004 (16 pages).

Kumari , L. et al., "Structural and electrical properties of amorphous carbon-sulfur composite films", Buletin of Material Science, v27 No. 3, Jun. 2004 (6 pages).

* cited by examiner

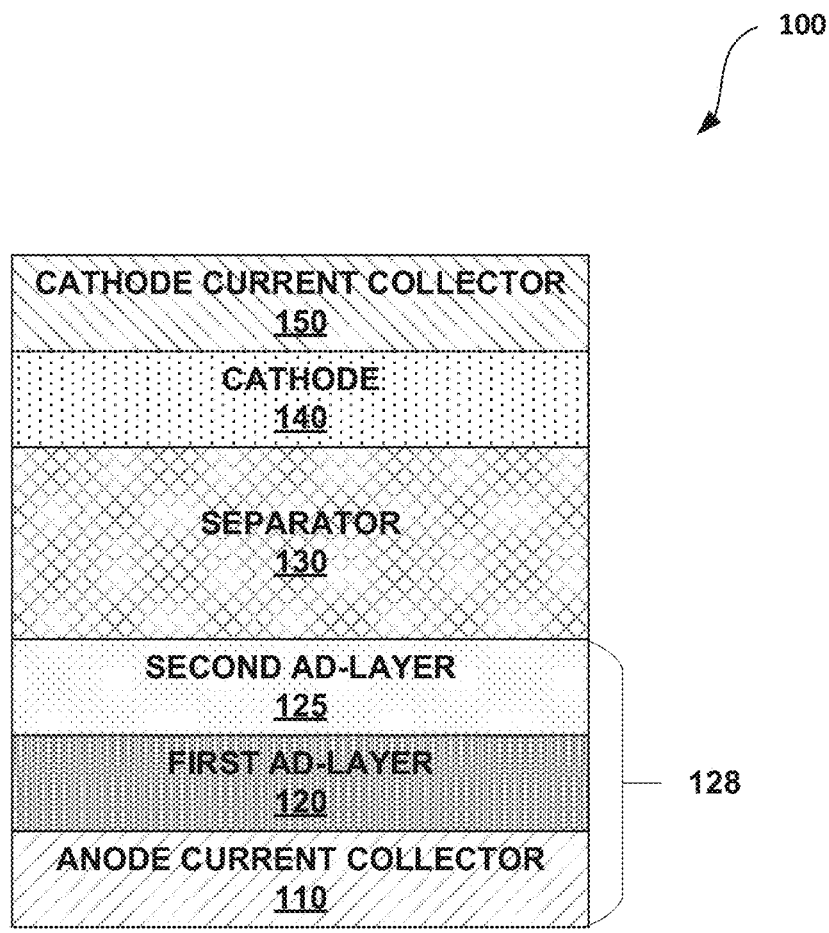

BATTERY CELL WITH ANODE PROTECTIVE LAYER

FIELD

This disclosure generally relates to solid state secondary batteries, and, more particularly, to solid state lithium batteries with a multi-layer anode.

BACKGROUND

Unless otherwise indicated herein, the materials described in this section are not prior art to the claims in this application and are not admitted to the prior art by inclusion in this section.

Rechargeable lithium batteries are attractive energy storage devices for portable electric and electronic devices and electric and hybrid-electric vehicles because of their high specific energy compared to other electrochemical energy storage devices. A typical lithium cell contains a negative electrode, a positive electrode, and a separator located between the negative and positive electrodes. Both electrodes contain active materials that react with lithium reversibly. In some cases, the negative electrode may include lithium metal, which can be electrochemically dissolved and deposited reversibly. The separator contains an electrolyte with a lithium cation, and serves as a physical barrier between the electrodes such that none of the electrodes are electrically connected within the cell.

Typically, during charging, there is generation of electrons at the positive electrode and consumption of an equal amount of electrons at the negative electrode. During discharging, opposite reactions occur.

Conventional Li-ion cells employ a liquid separator between the positive and negative electrodes. Conventional liquid separator materials undergo deleterious side reactions with the highly reactive lithium species present in the battery. The coulombic efficiency of a conventional Li-ion cell is less than about 99 percent. This results in the amount of available lithium being reduced to less than 36 percent after fewer than 100 charge/discharge cycles. A conventional strategy for accommodating this loss of available lithium is to provide a large excess of lithium to the cell during fabrication. As much as 4 times the stoichiometric amount of lithium needed by the cell is often provided, resulting in thicker, heavier cells and increased material costs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure are related to a solid state lithium battery cell having a protective ad-layer between the separator and anode.

In one embodiment, the disclosure provides a battery cell having an anode including an anode current collector, a first ad-layer and a second ad-layer. The battery cell also includes a separator having a solid polymer or a ceramic and a cathode.

In another embodiment, the disclosure provides a battery including one or more battery cells. The battery cells include an anode having an anode current collector, a first ad-layer and a second ad-layer. The battery cell also includes a separator having a solid polymer or a ceramic and a cathode.

The details of one or more features, aspects, implementations, and advantages of this disclosure are set forth in the accompanying drawings, the detailed description, and the claims below.

BRIEF DESCRIPTION OF THE DRAWINGS

FIG. 1 is a schematic diagram illustrating a battery cell, in accordance with some embodiments.

DETAILED DESCRIPTION

One or more specific embodiments will be described below. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

An embodiment of a battery cell 100 is shown in FIG. 1. The battery cell 100 includes an anode current collector 110 (e.g., copper foil, nickel foil). In various embodiments, a surface of the anode current collector 110 may be modified to enhance the adhesion of subsequent materials, depending on the application. In some embodiments, the surface of the anode current collector 110 may be modified by an oxidation or acid treatment. In another embodiment, the surface of the anode current collector 110 may be modified by the addition of a metal foam (e.g., nickel foam). In certain embodiments, the surface of the anode current collector 110 may include a continuous or discontinuous seed layer to enhance lithium deposition (e.g., copper particles, lithium particles, lithium magnesium alloys and/or other lithium metal alloys). In some embodiments, the thickness of the anode current collector 110 may be less than about 25 micrometers, less than about 15 micrometers, less than 10 micrometers, greater than 1 micrometer, greater than 3 micrometers and/or greater than 5 micrometers. Depending on the application, the thickness of the anode current collector 110 may varies.

In the example of FIG. 1, a first ad-layer 120 is, for example, disposed on or formed over the anode current collector 110. The first ad-layer 120 acts as a filter to allow access to the anode current collector 110 to lithium ions while blocking access to the anode current collector 110 to electrons, and solvent molecules resulting in improved coulombic efficiency. The first ad-layer 120 includes materials that are ionically conductive (e.g., lithium ion conducting) and electrically insulating. Materials for the first ad-layer 120 include, but are not limited to, amorphous carbon coatings (e.g., carbon sheets, carbon particles (e.g., spherical micro-beads)), single or multi-layer boron nitride layers (e.g., crystalline boron nitride, polycrystalline boron nitride and/or amorphous boron nitride), single or multi-layer graphene oxide films (e.g., graphene oxide and/or reduced graphene oxide), and/or thin layers, less than about 5 nanometers, of a metal oxide, a metal nitride and/or a metal phosphide derivative (e.g., aluminum oxide ($Al_2O_3$), lithium nitride ($Li_3N$), lithium phosphide ($Li_3P$), lithium phosphorous oxynitride (LiPON) and/or silicon nitride ($Si3N4$)) and combinations thereof. In some embodiments, the thickness of the first ad-layer 120 may be less than 1 micrometer, less than 50 nanometers, less than 20 nanometers, less than 10 nanometers, less than 5 nanometers, greater than 1 nanometer, greater than 2 nanometers and/or greater than 3 nanometers. Depending on the application, the thickness of the first ad-layer 120 may varies.

In the example of FIG. 1, a second ad-layer 125 is, for example, disposed on or formed over the first ad-layer 120. During the charging of the battery cell 100, the lithium deposited on the anode current collector 110 may be deposited non-uniformly, which may result in lithium dendrite formation. Lithium dendrites if unmitigated can cause an internal short within the battery cell 100 allowing rapid discharge which may damage the battery cell 100. The second ad-layer 125 may act as a protective and/or sealant layer over the first ad-layer 120 thereby forming a barrier to dendrite propagation through the battery cell 100. The second ad-layer 125 includes materials which are ionically conductive to lithium ions while reducing or preventing undesired species from reaching the first ad-layer 120 and/or the anode current collector 110. The introduction of the ad-layers permit charging of solid-state lithium batteries at considerably higher current density (e.g., 5 to 10 mA/cm2 vs. baseline of 0.2 to 1 mA/cm2). Materials for the second ad-layer 125 include, but are not limited to, a metal oxide derivative, a metal nitride derivative and/or a metal phosphide derivative (e.g., aluminum oxide ($Al_2O_3$), lithium nitride ($Li_3N$), lithium phosphide ($Li_3P$), lithium phosphorous oxynitride (LiPON) and/or silicon nitride ($Si3N4$), a sulfide derivative, a garnet (e.g., lanthanide lithium zirconium oxide (LLZO)) and/or a conducting polymer (e.g., polyethylene oxide (PEO), polyvinylidene fluoride (PVDF), polymethylmethacrylate (PMMA), and/or polyacrylonitrile (PAN)) and combinations thereof. In some embodiments, the thickness of the second ad-layer 125 may be less than 1 micrometer, less than 50 nanometers, less than 20 nanometers, less than 10 nanometers, less than 5 nanometers, greater than 1 nanometer, greater than 2 nanometers and/or greater than 3 nanometers. In an alternate embodiment, one or more materials of the second ad-layer 125 may be added to the first ad-layer 120 to form a mixed first ad-layer 120. In an alternate embodiment, the mixed first ad-layer 120 may be present in combination with the second ad-layer 125. In another alternate embodiment, the mixed first ad-layer 120 may be present without the second ad-layer 125. In the example of FIG. 1, the region of the battery cell 100 including the anode current collector 110, first ad-layer 120 and second ad-layer 125 is defined as the anode 128. The introduction of the protective and/or sealant properties of the ad-layers 120, 125, in some embodiments, may allow the formation of the anode 128 to be performed by a metal foil extrusion process resulting in a more efficient manufacturing process.

In the example of FIG. 1, a solid state ionically conductive separator 130 is either disposed on or formed over the second ad-layer 125 or the anode 128 to provide an ionically conductive electrically insulating medium through which lithium ions can move during the charging/discharging of the battery cell 100. Materials for the separator 130 include, but are not limited to, ceramic electrolytes (e.g., metal oxide derivatives, metal sulfide derivatives and/or metal phosphate derivatives), solid polymer electrolytes (e.g., polymers, co-polymers, block co-polymers (e.g., di-block co-polymers, and/or tri-block co-polymers)) and combinations thereof. In some embodiments, the polymers may be cross-linked. In some embodiments, the polymers may further include pendant groups. In some embodiments, the thickness of the separator 130 may be less than 25 micrometers, less than 20 micrometers, less than 15 micrometers, less than 10 micrometers, greater than 2 micrometers and/or greater than 4 micrometers.

The lithium species present in the battery cell 100 are highly reactive. In a conventional battery cell the liquid separator materials undergo deleterious side reactions with the highly reactive lithium species present near the anode current collector 110 resulting in reduced coulombic efficiency thus shortening battery life. In the example of FIG. 1 the ad-layers 120, 125 act as a barrier between the separator 130 and the reactive lithium species near the anode current collector 110.

The solid state materials of the separator 130 are less reactive to the lithium species present in the battery cell than conventional liquid separator materials. This reduced reactivity in conjunction with the isolation provided by the ad-layers 120, 125 results in improved coulombic efficiency of the battery cell 100. In some embodiments, the coulombic efficiency is greater than 99.9 percent. In certain embodiments the coulombic efficiency can exceed 99.99 percent resulting in over 80 percent of the lithium being available in the battery cell 100 after more than 2000 charge/discharge cycles. The high utilization of lithium in the battery cell 100 results in less lithium being needed within the battery cell 100 resulting in reduced material costs.

In some embodiments, an electrolyte salt may be added to the separator 130 to provide additional mobile ions of the charge carrier of the battery cell 100. Any electrolyte salt that includes the ion identified as the most desirable charge carrier for the application can be used. It is especially useful to use electrolyte salts that have a large dissociation constant within the polymer electrolyte. In one embodiment, the electrolyte salt may include a working ion such as LiTSI. Other suitable working ion for the electrolyte salt may be used.

Suitable examples of electrolyte salts include alkali metal salts (e.g., lithium salts). Examples of useful lithium salts include, but are not limited to, lithium hexafluorophosphate ($LiPF_6$), lithium bis(trifluoromethanesulfonimide) (LiN($CF_3SO_2$)$_2$), lithium tris(trifluoromethane) sulfonyl methide, (Li($CF_3SO_2$)$_3$C), lithium bis(perfluoroethylsulfonylimide) (LiN($SO_2CF_2CF_3$)$_2$), lithium boron dioxalate (LiB($C_2O_4$)$_2$), lithium fluorododecaborates ($Li_2B_{12}F_xH_{12-x}$), lithium nitrate, dilithium dodecafluorododecaborate ($Li_2(B_{12}F_{12})$), lithium tetracyanoborate (LiB($CN$)$_4$) and combinations thereof.

Suitable ceramic electrolytes include, but are not limited to, lithium zinc germanium oxide (LISICON), lithium sulfide-silicon sulfide-lithium phosphate ($Li_2S$—$SiS_2$—$Li_3PO_4$), lithium germanium phosphorous sulfide ($Li_{10}GeP_2S_{12}$), ($Li_{3.25}Ge_{0.25}P_{0.75}S_4$), lithium phosphorous sulfide ($Li_7P_3S_{11}$), lithium nitride ($Li_3N$), Li-beta-alumina, lithium silicon phosphorous oxide ($Li_{3.6}Si_{0.6}P_{0.4}O_4$), lithium sulfide-phosphorous sulfide ($Li_2S$—$P_2S_5$), lanthanide lithium titanium oxide (LLTO), lithium phosphorous oxynitride (LiPON), lithium aluminum titanium silicon phosphate (LATSP), lithium lanthanum zirconate (LLZO), lithium lanthanum titanate (LLTO) and combinations thereof.

Suitable solid polymer electrolytes may include, but are not limited to, polymers and/or co-polymers including an ionically conductive repeat unit (e.g., polyacetylenes, polyacrylates (e.g., polymethacrylate (PMA), and/or polymethylmethacrylate (PMMA)), ethylene oxide derivatives (e.g., polyethylene oxide (PEO), polystyrene-polyethylene oxide (PS-PEO)), propylene oxide derivatives, ethylene imine derivatives, silane derivatives, siloxane derivatives, vinylidene fluoride derivatives (e.g., polyvinylidene fluoride (PVDF)), aniline derivatives (e.g., polyaniline (PANT)), acrylonitrile derivatives (e.g., polyacrylonitrile (PAN)), thiophene derivatives (e.g., polythiophene), polyphosphazines, polyolefins, polydienes, polyethers, polyamines, polyimides, polyamides, alkyl carbonate based polymers, polynitriles and combinations thereof). In some embodiments, the solid polymer electrolyte may include a block co-polymer. Further details about the block co-polymer for the solid polymer electrolyte can be found in U.S. patent application Ser. No. 14/700,260, filed Apr. 30, 2015.

In the example of FIG. 1, a cathode 140 is either disposed on or formed over the separator 130. The cathode 140 includes a cathode active material able to provide ionic conductivity and accommodate the accumulation of the lithium oxidation product in the cathode 140. In some embodiments, the volume fraction of the cathode active materials of the cathode 140 may be 40 volume percent to 70 volume percent. Suitable materials for the cathode active material include, but are not limited to, sulfur or sulfur-containing materials (e.g., polyacrylonitrile-sulfur composites (PAN-S composites), lithium sulfide ($Li_2S$)); vanadium oxides (e.g., vanadium pentoxide ($V_2O_5$)); metal fluorides (e.g., fluorides of titanium, vanadium, iron, cobalt, bismuth, copper and combinations thereof); lithium-insertion materials (e.g., lithium nickel manganese cobalt oxide (NMC), lithium-rich NMC, lithium nickel manganese oxide ($LiNi_{0.5}Mn_{1.5}O_4$)); lithium transition metal oxides (e.g., lithium cobalt oxide ($LiCoO_2$), lithium manganese oxide ($LiMn_2O_4$), (LMO), lithium nickel cobalt aluminum oxide (NCA), nickel manganese cobalt oxide derivatives (e.g., NCM), high energy nickel manganese cobalt oxides (HENCM), and combinations thereof); lithium phosphates (e.g., lithium iron phosphate ($LiFePO_4$), (LFP)), a porous conductive material (e.g., carbon black, carbon fiber, graphite, graphene and combinations thereof) and an electrolyte (e.g., the electrolyte embodied above). In some embodiments, the cathode layer 140 may additionally include additives to enhance a property (e.g., mechanical properties, electrical properties and/or ionic conductivity) of the cathode layer 140. In some embodiments, the thickness of the cathode 140 may be less than 250 micrometers, less than 200 micrometers, less than 150 micrometers, less than 100 micrometers, greater than 50 micrometers and/or greater than 70 micrometers.

In the example of FIG. 1, a cathode current collector 150 is either disposed on or formed over the cathode 140. Suitable materials for the cathode current collector 150 include, but are not limited to, an aluminum foil and/or a gold foil. In some embodiments, the thickness of the cathode current collector 150 may be less than about 25 micrometers, less than about 15 micrometers, less than 10 micrometers, greater than 1 micrometer, greater than 3 micrometers and/or greater than 5 micrometers.

Although one battery cell 100 is illustrated, more than one battery cell 100 may be incorporated into a battery pack.

It is believed that embodiments described herein and many of their attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A battery cell, comprising:
    an anode comprising an anode current collector, a first ad-layer configured to be conductive to lithium ions and electrically insulating, and a second ad-layer configured as a protective layer and conductive to lithium ions;
    a separator comprising at least one of a solid polymer and a ceramic; and
    a cathode, wherein the first ad-layer comprises a material selected from the group consisting of amorphous carbon, boron nitride, graphene oxide, and combinations thereof.

2. The battery cell of claim 1, wherein the second ad-layer comprises a material selected from the group consisting of a metal oxide derivative, a metal nitride derivative, a metal phosphide derivative and combinations thereof.

3. The battery cell of claim 1, wherein the anode current collector comprises a copper foil or a nickel foil.

4. The battery cell of claim 3, wherein a surface of the copper foil or the nickel foil has been modified by an acid or oxidation treatment.

5. The battery cell of claim 3, wherein the copper foil or the nickel foil is coated with a nickel foam.

6. The battery cell of claim 3, wherein the copper foil or the nickel foil further comprises copper particles, lithium particles or a lithium alloy deposited thereon.

7. The battery cell of claim 1, wherein the separator comprises the ceramic and the solid polymer.

8. The battery cell of claim 1, wherein the separator comprises a block co-polymer.

9. The battery cell of claim 8, wherein the block co-polymer comprises a structural repeat unit and an ionically conductive repeat unit.

10. The battery cell of claim 9, wherein the structural repeat unit is selected from the group consisting of polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, polyxylenylether, polyvinylidene fluoride, and combinations thereof.

11. The battery cell of claim 9, wherein the ionically conductive repeat unit is selected from the group consisting of polyacetylenes, polyacrylates, ethylene oxide derivatives, polystyrene-polyethylene oxide, propylene oxide derivatives, ethylene imine derivatives, silane derivatives, siloxane derivatives, vinylidene fluoride derivatives, aniline derivatives, acrylonitrile derivatives, thiophene derivatives, polyphosphazines, polyolefins, polydienes, polyethers, polyamines, polyimides, polyamides, alkyl carbonate based polymers, polynitriles and combinations thereof.

12. The battery cell of claim 1, wherein the separator comprises a ceramic selected from the group consisting of lithium zinc germanium oxide, lithium sulfide-silicon sulfide-lithium phosphate, lithium germanium phosphorous sulfide, lithium phosphorous sulfide, lithium nitride, Li-beta-alumina, lithium silicon phosphorous oxide, lithium sulfide-phosphorous sulfide, lanthanide lithium titanium oxide, lithium phosphorous oxynitride, lithium aluminum titanium silicon phosphate, lithium lanthanum zirconate, lithium lanthanum titanate and combinations thereof.

13. The battery cell of claim 1, wherein a coulombic efficiency of the battery cell over an initial 2000 charge/discharge cycles is greater than 99.9 percent.

14. The battery cell of claim 13, wherein the coulombic efficiency of the battery cell over the initial 2000 charge/discharge cycles is greater than 99.99 percent.

15. The battery cell of claim 1, wherein the first ad-layer has a thickness of less than 1 micrometer.

16. A battery comprising:
at least one battery cell, including
an anode comprising an anode current collector, a first ad-layer configured to be conductive to lithium ions and electrically insulating, and a second ad-layer configured as a protective layer and conductive to lithium ions,
a separator comprising at least one of a solid polymer or a ceramic, and
a cathode, wherein the first ad-layer comprises a material selected from the group consisting of amorphous carbon, boron nitride, graphene oxide, and combinations thereof.

17. The battery of claim 16, wherein the first ad-layer has a thickness of less than 1 micrometer.

18. A battery cell comprising:
an anode comprising an anode current collector, a first ad-layer configured to be conductive to lithium ions and electrically insulating, and a second ad-layer configured as a protective layer and conductive to lithium ions;
a separator comprising at least one of a solid polymer and a ceramic; and
a cathode, wherein a coulombic efficiency of the battery cell over an initial 2000 charge/discharge cycles is greater than 99.9 percent.

19. The battery cell of claim 18, wherein the coulombic efficiency of the battery cell over the initial 2000 charge/discharge cycles is greater than 99.99 percent.

* * * * *